United States Patent [19]
Crow

[11] 3,841,422
[45] Oct. 15, 1974

[54] DYNAMIC ROCK BIT LUBRICATION SYSTEM

[75] Inventor: Morgan LeVon Crow, Dallas, Tex.

[73] Assignee: Dresser Industries, Inc., Dallas, Tex.

[22] Filed: Oct. 23, 1973

[21] Appl. No.: 408,986

[52] U.S. Cl. .............................. 175/229, 175/372
[51] Int. Cl. ........................... E21b 9/08, E21b 9/35
[58] Field of Search ........................... 175/227–229, 175/337, 340, 371, 372; 308/8.2

[56] References Cited
UNITED STATES PATENTS

| | | | |
|---|---|---|---|
| 1,909,128 | 5/1933 | Scott et al. | 175/228 X |
| 2,906,504 | 9/1959 | Parks | 175/228 |
| 3,251,634 | 5/1966 | Dareing | 175/228 X |
| 3,463,270 | 8/1969 | Lundstrom et al. | 175/228 X |
| 3,476,195 | 11/1969 | Galle | 175/228 |
| 3,735,825 | 5/1973 | Keller | 175/228 |

*Primary Examiner*—David H. Brown
*Attorney, Agent, or Firm*—Eddie E. Scott

[57] ABSTRACT

Lubricant is circulated from a lubricant reservoir to the bearings of a rotary rock bit and back to the lubricant reservoir by a lubricant circulation system that is operated by movement of the cone cutter upon the bearing pin of the bit. A positive seal is positioned between the rolling cone cutter and the arm of the bit to maintain lubricant in the bearing area and to prevent fluid in the borehole from entering the bearing area. A lubricant reservoir is located in the bit body. A first passage connects the lubricant reservoir with the bearing area to channel lubricant from the lubricant reservoir to the bearing area. A second passage extends from the bearing area to the lubricant reservoir to allow lubricant to be channeled back to the lubricant reservoir. A check valve in at least one of said passages insures one-way flow of lubricant. Axial movement of the cone cutter on the bearing pin provides a pumping action to circulate lubricant from the lubricant reservoir through said first passage to the bearing area and from the bearing area through said second passage back to said lubricant reservoir.

4 Claims, 3 Drawing Figures

DYNAMIC ROCK BIT LUBRICATION SYSTEM

BACKGROUND OF THE INVENTION

The present invention relates to the earth boring art and more particularly to a lubrication system for a rotary rock bit. A rotary rock bit must operate under very severe environmental conditions and the geometry of the bit is restricted by the operating characteristics. At the same time, the economies of petroleum production demand a longer lifetime and improved performance from the bit. It attempting to provide an improved bit, new and improved materials have been developed for the cutting structure of the cones, thereby providing a longer useful lifetime for the cones. This has resulted in the bearing system being the first to fail during the drilling operation. Consequently, a need clearly exists for a system that will extend the useful lifetime of the bit.

DESCRIPTION OF PRIOR ART

In U.S. Pat. No. 3,244,459 to J. E. Ortloff, patented Apr. 5, 1966, a lubricating system for extending the life of the bearings of a roller cone type bit is shown. Sealing means are provided to effectively separate or close off the clearance between the journal of the leg and the bearings of the roller cone from the exterior of the bit. A special pump means is provided to circulate the lubricating fluid under high pressure through this sealed-off clearance space. The pump means is actuated by the rotation of the roller cone element on the shaft.

In U.S. Pat. No. 3,251,634 to D. W. Dareing, patented May 17, 1966, a lubricating system for extending the life of the bearings of a roller cone type bit is shown. Sealing means are provided to effectively separate or close off the clearance or space between the journal of the leg and the bearings of the roller cone from the exterior of the bit. An electrical pump means is provided to supply a lubricating fluid under high pressure to this sealed-off clearance space.

SUMMARY OF THE INVENTION

In order to extend the useful lifetime of the bearings of a rock bit, the present invention provides a system for circulating lubricant from a lubricant reservoir to the bearings and back to the lubricant reservoir. A positive seal is positioned between the rolling cone cutter and the arm of the bit to maintain lubricant in the bearing area and to prevent fluid in the borehole from entering the bearing area. A first passage connects the lubricant reservoir with the bearing area to channel lubricant from the lubricant reservoir to the bearing area. A second passage extends from the bearing area to the lubricant reservoir to allow lubricant to be channeled back to the lubricant reservoir. Valve means provide one-way flow of lubricant in said first and second passages. Axial movement of the cone cutter on the bearing pin provides a pumping action to circulate lubricant from the lubricant reservoir through said first passage to the bearing area and from the bearing area through said second passage back to said lubricant reservoir.

The above and other features and advantages of the present invention will become apparent from a consideration of the following detailed description of the invention when taken in conjunction with the drawings.

DETAILED DESCRIPTION OF THE INVENTION

Figure 1:
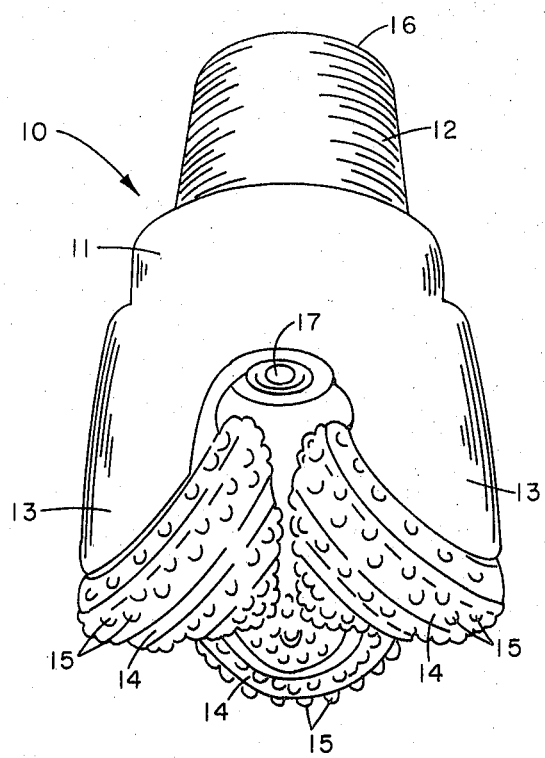
FIG. 1 illustrates a three cone seal bearing rotary rock bit constructed in accordance with the present invention.

Referring now to the drawings and to FIG. 1 in particular, shown therein and generally designated by the reference number 10 is a three cone sealed bearing rotary rock bit. As illustrated, the bit 10 includes a bit body 11, including an upper threaded portion 12. The threaded portion 12 allows the bit 10 to be connected to the lower end of a rotary drill string (not shown). Depending from the bit body 11 are three substantially identical arms with two of the arms 13 and 13' being shown in FIG. 1. The lower end of each of the arms is provided with an extended journal portion and the details of this journal portion will be discussed subsequently. The three rotary cone cutters 14, 14' and 14'' are rotatably positioned on three bearing pins extending from the arms. Each of the cutters 14, 14', and 14'' includes cutting structure 15, 15', and 15'' on its outer surface adapted to disintegrate formations as the bit 10 is rotated and moved downward. The cutting structure 15, 15', 15'' is shown in the form of tungsten carbide inserts. However, it is to be understood that other cutting structures such as steel teeth may be used as a cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, past the cutting structure 15, 15', and 15'' of the cone cutters, 14, 14' and 14''. In use, the bit 10 is connected as the lower member of a rotary drill string (not shown) and lowered into the well bore until the cone cutters engage the bottom of the well bore. Upon engagement with the bottom of the well bore, the drill string is rotated, rotating bit 10 therewith. Drilling fluid is forced down through the interior passage of the rotary drill string by mud pumps located at the surface. The drilling fluid continues through the central passageway 16 of bit 10, passing through the nozzles past the cutting structure of the cutters to the bottom of the well bore, thence upward in the annulus between the rotary drill string and the wall of the well bore, carrying with it the cuttings and debris from the drilling operation.

Figure 2:
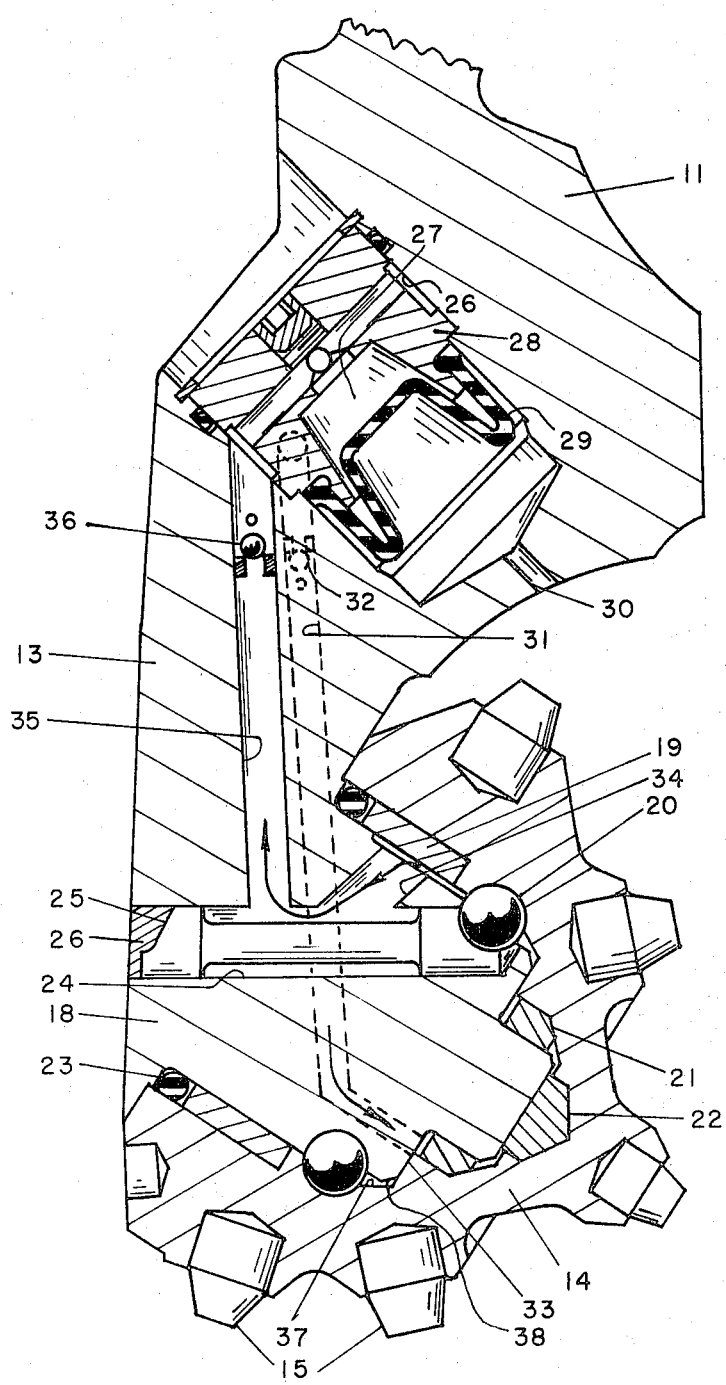
FIG. 2 is a sectional view of one arm of the bit of FIG. 1 showing the lubricant circulation system.

Referring now to FIG. 2, a sectional view of one arm 13 of the bit 10 is shown. The cutter 14 is rotatably positioned on the journal portion of the arm 13 and adapted to disintegrate earth formations as the bit is rotated. The journal portion of the arm 13 consists of a bearing pin 18 on which the cutter 14 is mounted. A plurality of bearing systems are located in the bearing area between the cutter 14 and the bearing pin 18. The bearing systems in the bearing area include an outer friction bearing 19, a series of ball bearings 20, an inner friction bearing 21 and a thrust button 22. An O-ring seal 23 is positioned between the cutter 14 and the bearing pin 18. This seal retains lubricant in the bearing area around the bearing systems and prevents any materials in the well bore from entering the bearing area. The O-ring seal 23 prevents fluid flow in either direction. A passageway 24 allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to flow through the passageway 24.

A cylindrical reservoir chamber 26 is located in the bit body 11. A lubricant reservoir 27 containing a suitable lubricant is positioned in the lubricant reservoir chamber 26. The lubricant reservoir 27 consists of a lubricant reservoir canister 28 with a flexible diaphragm 29 attached. A vent passage 30 allows the pressure of the fluid in the borehole to be transmitted to the outside of the flexible diaphragm 29. A passage 31 extends from the lubricant reservoir to the bearing area between cutter 14 and bearing pin 18. A check valve 32 provides one-way flow of lubricant in the passage 31. The passage 31 terminates at the flange 33 of the bearing pin 18. A passage 34 extends from the area proximate journal bearing 19 to the passage 24. As previously explained, passage 24 extends from the area proximate the ball bearings 20. A passage 35 extends from the passage 24 to the lubricant reservoir 27. A check valve 36 provides one-way flow of lubricant in the passage 35.

Some clearance exists between the interior surface 37 of the cone cutter 14 and the exterior surface 38 of the bearing pin 18. This clearance allows the lubricant to circulate through the bearing area. In addition to the rotational movement of cone cutter 14 upon bearing pin 18, the cutter 14 has a limited amount of axial movement on the bearing pin 18. The limited amount of axial movement of cutter 14 provides a pumping action to circulate lubricant from the lubricant reservoir 27 through passage 31 to the bearing area and from the bearing area through passages 24, 34, and 35 back to the lubricant reservoir. The interior surface 37 of cutter 14 acts as a cylinder and the exterior surface 38 of bearing pin 18 acts as a piston. The cooperation of the piston and cylinder action and the seal 23 serves to pump lubricant through the passages. During the drilling operation the cutter 14 is exposed to external forces that create a reciprocating axial movement of cutter 14 upon bearing pin 18 thereby circulating lubricant from the lubricant reservoir to the bearing area and back to the lubricant reservoir.

Figure 3:
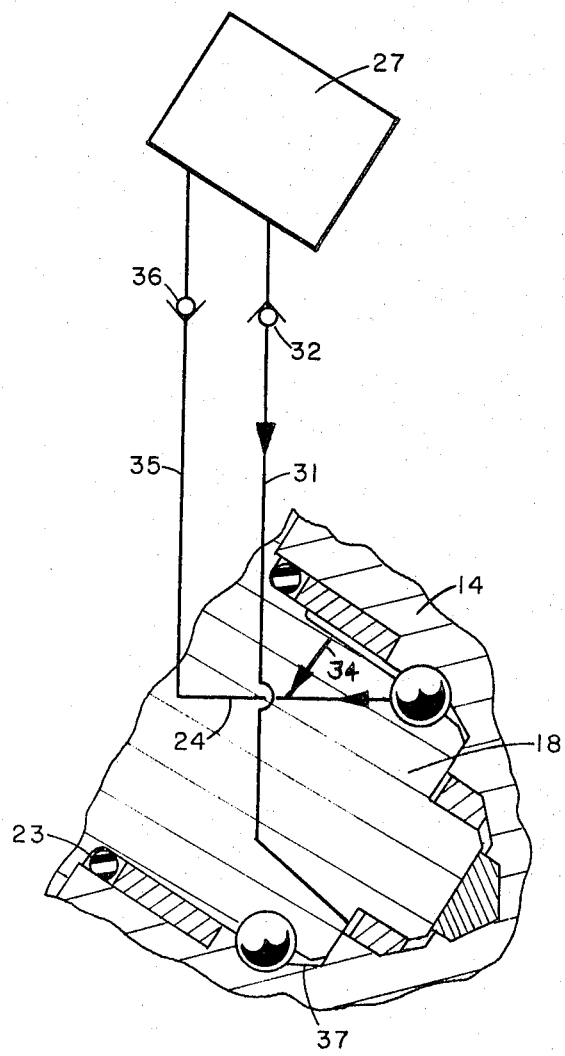
FIG. 3 is a schematic diagram of the lubricant circulation system of the present invention.

Referring now to FIG. 3, a schematic diagram of the lubricant circulation system is shown. Lubricant in the lubricant reservoir 27 is transmitted through the passage 31 to the bearing area between cutter 14 and bearing pin 18. A check valve 32 insures one-way flow in passage 32 by preventing flow from passage 31 into lubricant reservoir 27. Lubricant in the bearing area is transmitted through passages 24, 34, and 35 back to the lubricant reservoir 27. The interior surface 37 of cutter 14 acts as a cylinder and the exterior surface 38 of bearing pin 18 acts as a piston in cooperation with seal 23 to pump lubricant through the passages 31, 34, 24, and 35. The check valves 32 and 36 insure that the lubricant will flow only one way in the passages. During the drilling operation, the cutter 14 is exposed to external forces that create reciprocating axial movement of cutter 14 upon bearing pin 18 to circulate lubricant through the lubricant circulation system.

The embodiments of the invention in which an exclusive property or privilege is claimed are defined as follows:

1. In an earth boring bit including a bit body with a bearing pin extending from said bit body, a rotatably cutter mounted upon said bearing pin, bearing means between said bearing pin and said cutter, and a lubricant circulation system, comprising:

a lubricant reservoir in said bit body;

first passage means for channeling lubricant from said lubricant reservoir to said bearing means;

second passage means for channeling lubricant from said bearing means to said lubricant reservoir;

valve means for providing one-way flow of lubricant in said first passage means and said second passage means, and seal means between said cutter and said bit body for providing a positive seal between said cutter and said bit body.

2. The earth boring bit of claim 1 wherein said seal means is an O ring seal.

3. A rotary rock bit for drilling in a borehole filled with fluid, comprising:

a bit body, said bit body including at least one bearing pin extending from said bit body, said bearing pin having a bearing pin exterior surface;

a rotatable cutter mounted upon said bearing pin for rotational movement and a limited amount of axial movement, said rotatable cutter having a cutter interior surface;

seal means between said bit body and said rotatable cutter for providing a positive seal between said cutter and said bit body;

bearing means between said bearing pin and said cutter for promoting rotation of said rotatable cutter;

a lubricant reservoir in said bit body, said lubricant reservoir containing lubricant;

first passage means for channeling lubricant from said lubricant reservoir to said bearing means;

second passage means for channeling lubricant from said bearing means to said lubricant reservoir;

valve means for providing one-way flow of lubricant in said first and said second passage means; and pump means for pumping lubricant through said passage means, said pump means consisting of said bearing pin exterior surface and said rotatable cutter interior surface acting upon said lubricant in response to axial movement of said rotatable cutter.

4. The rotary rock bit of claim 3 wherein said seal means is an O ring seal.

* * * * *